(No Model.)
J. W. HOWELL.
ELECTRICAL DISTRIBUTION.
No. 372,799.　　　　　　　　　　Patented Nov. 8, 1887.
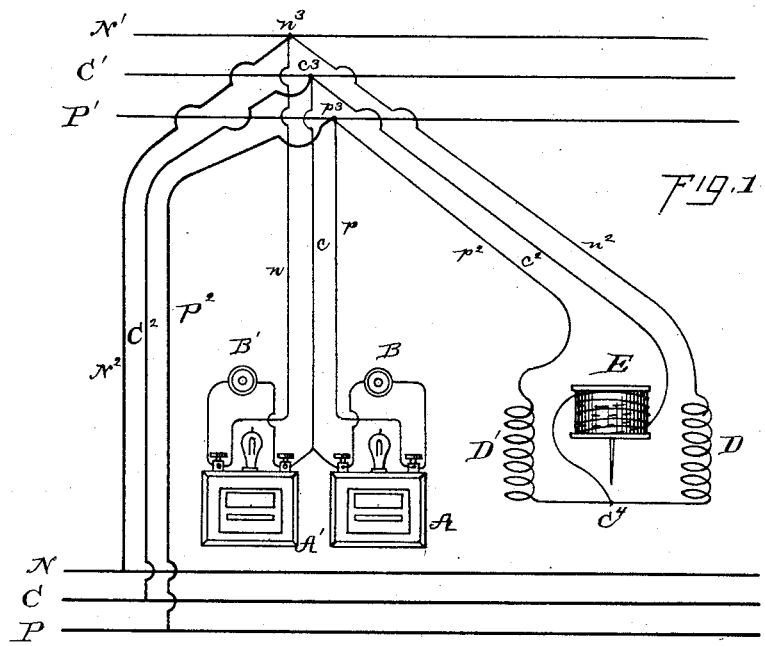
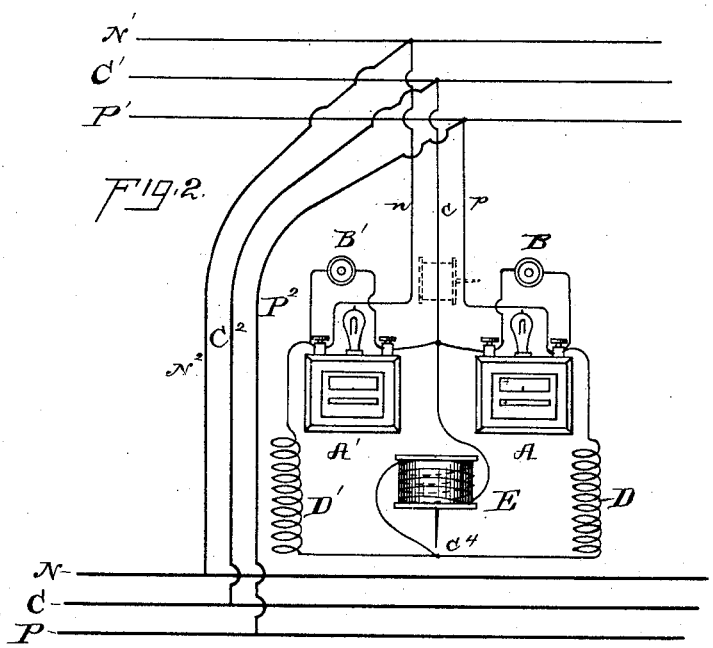
ATTEST:
INVENTOR:
John W. Howell

மற்றும்...

UNITED STATES PATENT OFFICE.

JOHN W. HOWELL, OF NEW BRUNSWICK, NEW JERSEY.

ELECTRICAL DISTRIBUTION.

SPECIFICATION forming part of Letters Patent No. 372,799, dated November 8, 1887.

Application filed March 4, 1887. Serial No. 229,687. (No model.)

*To all whom it may concern:*

Be it known that I, JOHN W. HOWELL, of New Brunswick, in the county of Middlesex and State of New Jersey, have invented a certain new and useful Improvement in Systems of Electrical Distribution, of which the following is a specification.

In the Edison three-wire system of electrical distribution, in which two or more feeding-circuits each composed of a positive, a negative, and a neutral or compensating conductor extend from a three-wire omnibus circuit at the central station to different points in a connected system of three-wire mains or lighting-circuits, it is necessary or desirable to maintain the same pressure or difference of potentials at the outer terminals of all the feeders on both positive and negative sides. In such a system it has heretofore been customary to provide in connection with each feeder two indicators connected across a three-wire indicating or pressure circuit extending from the outer terminals of the feeder to the central station. These indicators show the pressure at the ends of the feeders, and therefore will ordinarily show whether the pressure on one side of the feeder is greater or less than that on the other. Such indicators, however, sometimes lose their adjustment relative to each other, and therefore may for a time give unreliable indications.

The object of my invention is to provide an indicator showing simply whether the pressures on the two sides of a feeder are or are not the same and the extent of any variation, which balance-indicator may be used in connection with the pressure-indicators above mentioned, or one of them, or may be employed by itself in connection with a feeder. In the comparative method of indicating pressures set forth in my Patent No. 352,691, dated November 16, 1886, only two absolute pressure-indicators are used, which show the pressures at the end of the standard feeder, one showing the pressure on the positive side and one on the negative side. The pressures at the ends of all other feeders are shown by galvanometers, which simply copy the pressure set by the two absolute indicators above mentioned, so when these galvanometers on the positive side are all on zero the pressures at all feeder ends on the positive side are the same and are equal to that maintained at the end of the standard feeder by the positive absolute indicator. Thus the pressure maintained on the entire positive side depends upon one instrument, and that on the entire negative side on one instrument, and any change in the adjustment of one of these instruments affects the entire side to which it is connected; and in such a system it is especially desirable to have some means of showing at once any change in the adjustment of one of these absolute indicators, causing a wrong pressure to be maintained on one side. As it is not at all probable that both the absolute indicators will change their adjustment in the same way at the same time, it is only necessary to provide an instrument which will show whether the pressures on the two sides of the standard feeder are or are not the same, for the two absolute indicators being once adjusted alike will remain alike till one changes. This change will affect the pressure on that side, and it will be at once shown on the balance-indicator, showing it to be necessary to readjust the absolute indicators.

My invention is illustrated in the annexed drawings, in which—

Figure 1 is a diagram showing a form of my invention in which the balance-indicator is connected with its own separate pressure-wires or indicating-circuit; and Fig. 2, a diagram showing two forms—one in dotted lines—in which the balance-indicator is joined to the same pressure-circuit as the volt or pressure-indicators.

P C N are the positive, neutral, and negative omnibus conductors at the central station.

P' C' N' represent the system of connected mains or lighting-circuits.

P² C² N² is any feeding-circuit—of which two or more are usually provided—extending from the omnibus circuit to the mains.

*p c n* is the ordinary pressure-circuit extending from the feeder terminals to the station, where it is joined to indicators A A', preferably of the kind set forth in my Patent No. 339,058, dated March 30, 1886, which constantly indicate the pressure at the terminals of the feeder. Around each of these indicators is formed a shunt, in which is placed a lamp-socket, B or B', adapted to receive an incandescent electric lamp of a resistance about the same as that of the indicator around which it is shunted.

Referring now to Fig. 1, $p^2 c^2 n^2$ is a second pressure-circuit extending from the terminals of the feeder to the station. The outer conductors, $p^2 n^2$, of this circuit are joined through two equal resistances, D D', and the neutral wire $c^2$ is joined to them at a point midway between these two resistances. In said neutral wire are included the coils of a galvanometer, E.

It will be understood that it is desired to continually maintain the same difference of potentials between the points $p^3$ and $c^3$ as between the points $c^3$ and $n^3$. When this difference is the same the potential of the point $c^3$ is midway between $p^3$ and $n^3$. So also is the potential at the point $c^4$ when $c^2$ is connected between the equal resistances D D'. Therefore, so long as the balance is maintained, or there is the same difference of potential between $p^3$ and $c^3$ as between $c^3$ and $n^3$, no current will flow in $c^2$; but if the balance changes and the difference becomes greater on one side than on the other current will flow in one direction or the other in wire $c^2$, whereby the galvanometer E will be deflected one way or the other, and by the extent and direction of its deflection the nature and extent of the variation is shown. Suitable regulating devices are provided for the feeders, as will be readily understood, which are adjusted in accordance with these indications.

If it is found that one of the indicators, A or A', is out of adjustment, and it is necessary to remove it from its place for repairs, a lamp belonging to this indicator is screwed into the socket B or B', so as to occupy in the circuit the place of the removed indicator. Thus the pressure-wires will not be unbalanced by the removal of the indicator, and the operation of the balance-indicator and remaining absolute indicator will proceed as before. The whole indication necessary may then be done by the remaining pressure-indicator and the balance-indicator, for the former will show absolutely the pressure on one side of the feeder, while the latter shows whether or not the pressure on the other side is greater or less and how much. The practicability of using a single absolute indicator and a balance-indicator together forms one of the advantageous features of my invention.

In the arrangement shown in Fig. 2 only one set of pressure-wires is employed for both the pressure-indicators and the balance-indicator. These wires $p^2 c^2 n^2$ extend to the station and to indicators A A', as before. Additional wires extend from these indicators—one on each side—and are joined through the equal resistances B B'. From between the two indicators a wire extends to the point $c^4$ between the two resistances, which wire includes the galvanometer E. It will be seen that in this arrangement, as in that already described, no current will flow through the galvanometer so long as the balance of the system is maintained; but when it is out of balance current will flow through the galvanometer and deflect it in one or the other direction.

The function of the resistances B B' in both arrangements is to provide a middle point for connecting the neutral indicating-wire, the resistances being such that small differences between the resistances of the two outside wires themselves will be of no consequence. These resistances may, however, be sometimes dispensed with in the arrangement shown in Fig. 2 if the two indicators A A' are of the same resistance. The galvanometer E is here shown in dotted lines as connected directly in the neutral pressure-wire. When this is done the resistances B B' are omitted and the indicators A A' take their place, the galvanometer-wire being joined midway between said indicators. The effect is evidently the same as has been described.

What I claim is—

1. In a three-wire system of electrical distribution, the combination, with a circuit composed of positive, negative, and neutral conductors, of equal resistances in series between the positive and negative conductors, and a galvanometer connected between the neutral conductor and a point between said equal resistances, substantially as set forth.

2. In a three-wire system of electrical distribution, the combination, with a three-wire feeding-circuit, of a three-wire indicating-circuit connected with the terminals thereof, the outside wires of said indicating-circuit being joined through two equal resistances and the neutral wire being connected midway between said resistances, and a galvanometer in said neutral wire, substantially as set forth.

3. In a three-wire system of electrical distribution, the combination, with a three-wire feeding-circuit, of two equal resistances in series in a circuit joining the outer terminals of the positive and negative conductors of said feeder, and a galvanometer in a circuit-conductor connecting the outer terminal of the neutral feeder-conductor with said joining-circuit between its two resistances, substantially as set forth.

4. In a three-wire system of electrical distribution, the combination, with a three-wire feeding-circuit, of two equal resistances in series in a circuit joining the outer terminals of the positive and negative conductors of said feeder, a galvanometer in a circuit-conductor connecting the outer terminal of the neutral feeder-conductor with said joining-conductor between its two resistances, and means for indicating absolutely the pressure at the outer terminals of said feeder, substantially as set forth.

5. In a three-wire system of electrical distribution, the combination, with a three-wire feeding-circuit, of a three-wire indicating-circuit connected with the terminals thereof, two pressure-indicators connected across said indicating-circuit, and a galvanometer affected by the current in the neutral wire of said indicating-circuit, substantially as set forth.

6. In a three-wire system of electrical distribution, the combination, with a three-wire feeding-circuit, of a three-wire indicating-circuit connected with the terminals thereof, two pressure-indicators connected across said indicating-circuit, a shunt around each of said indicators adapted to be closed through a resistance equivalent to that of the indicator, and a balance-indicator connected with said feeding-circuit, substantially as set forth.

7. In a three-wire system of electrical distribution, the combination, with a three-wire feeding-circuit, of a three-wire indicating-circuit connected with the terminals thereof, two pressure-indicators connected across said indicating-circuit, a socket adapted to receive an incandescent electric lamp in a shunt around each of said indicators, and a balance-indicator connected with said feeding-circuit, substantially as set forth.

This specification signed and witnessed this 28th day of February, 1887.

JOHN W. HOWELL.

Witnesses:
FRANCIS E. JACKSON,
GEORGE F. MORRISON.